Feb. 27, 1923.

J. E. BRAWNER

BOLL WEEVIL CATCHER

Filed Apr. 13, 1922

1,446,871

Inventor,
Jeptha Edward Brawner,
By _____
Attorney

Patented Feb. 27, 1923.

1,446,871

UNITED STATES PATENT OFFICE.

JEPTHA EDWARD BRAWNER, OF KINGSBURY, TEXAS.

BOLL-WEEVIL CATCHER.

Application filed April 13, 1922. Serial No. 552,152.

*To all whom it may concern:*

Be it known that I, JEPTHA EDWARD BRAWNER, a citizen of the United States of America, and resident of Kingsbury, in the county of Guadalupe and State of Texas, have invented certain new and useful Improvements in Boll-Weevil Catchers, of which the following is a specification.

This invention relates to cotton insect collectors or catchers, and particularly to a device for use in catching and destroying boll weevil.

An object of this invention is to produce a traveling trap adapted to dislodge boll weevil from the plant and catch them in their descent, the said device having means for directing or guiding the boll weevil to a receptacle or pan containing fluid such as coal oil or the like, which can be burned or which will serve to kill the boll weevil without their being burned.

It is a further object of this invention to produce a traveling trap or collector of the character indicated which will serve to displace the branches of the plants so as to prevent the trap from running over them when the branches are low or in engagement with the ground being cultivated.

It is a further object of this invention to produce a novel agitating device, associated with the trap, effective to engage the plants and bend them over the trap or collector, so that the boll weevil which are dislodged will fall into the collector; and the invention further contemplates the provision of means for adjusting the agitating or collector arms or beaters in order that they will be operative in connection with plants of different heights.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
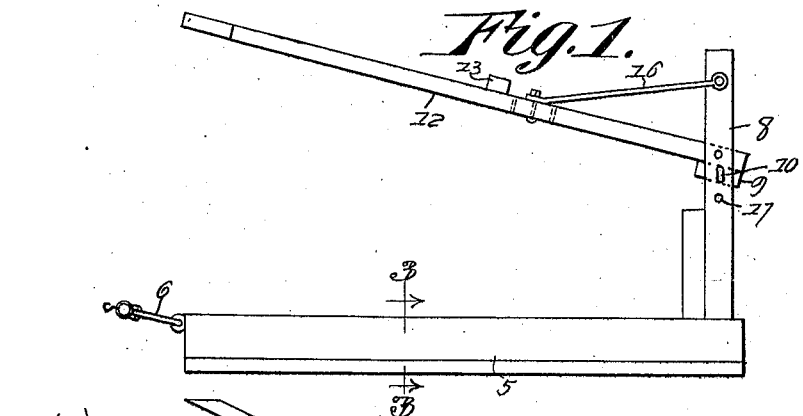
Figure 1 illustrates a view in elevation of a boll weevil collector embodying the invention.
Figure 2:
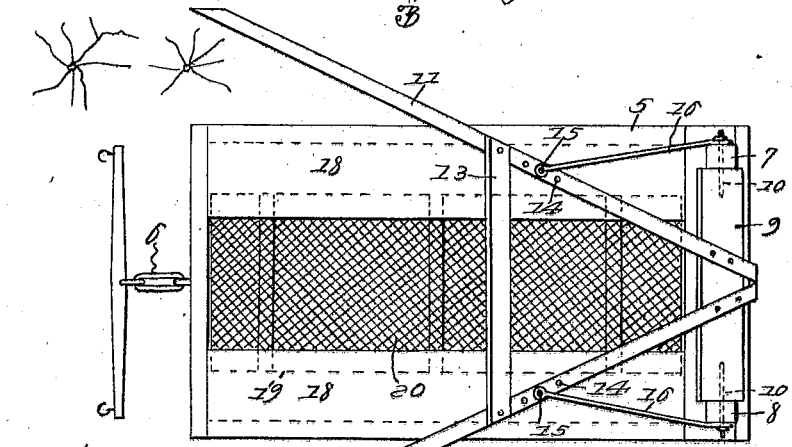
Figure 2 illustrates a plan view thereof.
Figure 3:
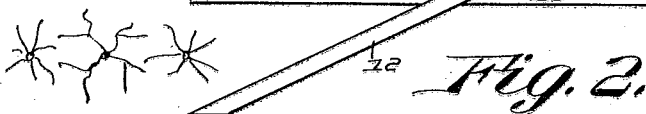
Figure 3 illustrates a sectional view on the line 3—3 of Fig. 1.

In these drawings 5 denotes a rectangular casing or box-like structure having a flat bottom and a square front end, the said casing being adapted to be drawn between rows of cotton plants, and it is provided with a hitch 6 which may be of any appropriate type.

At the rear of the casing, there are two standards or uprights 7 and 8, between which a head 9 is mounted on pivots such at 10, for providing relative rotary motion of the head. Diverging arms 11 and 12 have their inner ends connected to the head, and these arms have a brace 13 attached to them to prevent their spreading. The arms have apertures 14 to receive fastenings 15 by which stay rods 16 may be attached to the arms at different positions of adjustment for the purpose of holding the arms at different inclinations so that their outer ends will be in proper position to engage the vegetation being treated. The standards or posts 7 are provided with apertures 17 at different heights in order that the position of the head may be adjusted to locate the arms in proper relation to the vegetation being treated.

The stays have their ends connected to the pintles 10 and they may be secured thereon in any appropriate way so that by the employment of the adjustment for the head and the adjustment by which the stays are connected to the arms, the device can be adapted for low or high plants, as the season progresses.

Any suitable handle may be provided for the collector for the purpose of guiding it, but as handles are well known expedients in devices of this class, it is believed unnecessary to show any particular form for an understanding of the invention by one skilled in the art.

The casing is provided with aprons 18 which direct the boll weevil to the holder or pan 19 within the casing as the apparatus vibrates while traveling over the uneven surfaces of the soil. The pans may be removed through suitable openings in the casing for the purpose of emptying the pans or destroying the insects. The pans may be made in sections or one large pan may be employed, this being a matter for convenience in manufacture. The pan may be provided with a mesh cover 20 which will permit the insects to fall into the pan, but the said wire mesh will exclude leaves and other vegetation.

I claim:

1. In a boll weevil catcher, a substantially rectangular casing having a flat bottom, posts extending upwardly from the rear of the casing, a head adjustably and rotatably mounted between the standards, arms having their ends connected to the head and having their forward ends diverging, stays adjustably connected to the said arms, the said stays being anchored to the standards, and a boll weevil holder carried by the casing.

2. In a boll weevil catcher, a substantially rectangular casing having a flat bottom, posts extending upwardly from the rear of the casing, a head adjustably and rotatably mounted between the standards, arms having their ends connected to the head and having their forward ends diverging, stays adjustably connected to the said arms, the said stays being anchored to the standards, a boll weevil holder carried by the casing, and aprons extending inwardly from the sides of the casing and terminating over the holder for directing the boll weevil to the holder.

JEPTHA EDWARD BRAWNER.